United States Patent
Umeda et al.

(10) Patent No.: US 12,213,085 B2
(45) Date of Patent: Jan. 28, 2025

(54) REPORTING OF ACHIEVABLE POWER PER COMPONENT CARRIER WITH MULTIPLE POWER SOURCES

(71) Applicant: NOKIA TECHNOLOGIES OY, Espoo (FI)

(72) Inventors: Hiromasa Umeda, Kanagawa (JP); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 313 days.

(21) Appl. No.: 17/830,965

(22) Filed: Jun. 2, 2022

(65) Prior Publication Data
US 2023/0397127 A1   Dec. 7, 2023

(51) Int. Cl.
*H04W 52/36* (2009.01)
*H04W 8/24* (2009.01)
*H04W 72/044* (2023.01)

(52) U.S. Cl.
CPC .......... *H04W 52/367* (2013.01); *H04W 8/24* (2013.01); *H04W 72/0473* (2013.01)

(58) Field of Classification Search
CPC . H04W 52/367; H04W 8/24; H04W 72/0473; H04W 52/146; H04W 52/34; H04W 52/346; H04W 52/365; H04L 5/001
See application file for complete search history.

(56) References Cited

U.S. PATENT DOCUMENTS

| | | | | |
|---|---|---|---|---|
| 2012/0083309 | A1* | 4/2012 | Kwon | H04B 17/24 455/522 |
| 2013/0121264 | A1 | 5/2013 | Heo et al. | |
| 2013/0223406 | A1 | 8/2013 | Vujcic | |
| 2015/0319753 | A1* | 11/2015 | Chen | H04L 1/1812 370/329 |
| 2016/0192350 | A1* | 6/2016 | Yi | H04L 5/0035 370/329 |
| 2021/0092690 | A1 | 3/2021 | Bergström et al. | |
| 2021/0136604 | A1* | 5/2021 | Zhou | H04B 7/0695 |

(Continued)

FOREIGN PATENT DOCUMENTS

WO   WO-2022094882 A1 *  5/2022

OTHER PUBLICATIONS

International Search Report and Written Opinion dated Aug. 21, 2023, corresponding to International Patent Application No. PCT/FI2023/050243.

(Continued)

*Primary Examiner* — Angelica Perez
(74) *Attorney, Agent, or Firm* — SQUIRE PATTON BOGGS (US) LLP (57) ABSTRACT

Systems, methods, apparatuses, and computer program products for reporting of achievable power per component carrier with multiple power sources and configuration based on such reporting are provided. For example, a method can include receiving a request to report user equipment band combination capabilities. The method can also include reporting a capability of a user equipment to a network. The capability can include indication of one or more component carrier groups per band combination or per band. The one or more component carrier groups can contain indication of one or more power sources for the component carrier group.

20 Claims, 6 Drawing Sheets

(56) References Cited

U.S. PATENT DOCUMENTS

| | | | |
|---|---|---|---|
| 2021/0144569 A1* | 5/2021 | Zhou | H04W 8/24 |
| 2022/0353036 A1* | 11/2022 | Gao | H04L 5/0048 |
| 2023/0171061 A1* | 6/2023 | Yuan | H04L 5/001 |
| | | | 370/329 |

OTHER PUBLICATIONS

3GPP TS 38.101-1 V17.5.0 (Mar. 2022), Technical Specification, 3rd Generation Partnership Project; Technical Specification Group Radio Access Network; NR; User Equipment (UE) radio transmission and reception; Part 1: Range 1 Standalone (Release 17), Mar. 2022.

3GPP TS 38.101-2 V17.5.0 (Mar. 2022), Technical Specification, 3rd Generation Partnership Project; Technical Specification Group Radio Access Network; NR; User Equipment (UE) radio transmission and reception; Part 2: Range 2 Standalone (Release 17), Mar. 2022.

3GPP TS 38.306 V17.0.0 (Mar. 2022), Technical Specification, 3rd Generation Partnership Project; Technical Specification Group Radio Access Network; NR; User Equipment (UE) radio access capabilities (Release 17), Mar. 2022.

3GPP TS 38.331 V17.0.0 (Mar. 2022), Technical Specification, 3rd Generation Partnership Project; Technical Specification Group Radio Access Network; NR; Radio Resource Control (RRC) protocol specification (Release 17), Mar. 2022.

Huawei et al., "On Increasing MOP for NR inter-band CA," 3GPP Draft; R4-2201836, 3GPP TSG-RAN WG4 Meeting #101bis-e, Electronic meeting, Jan. 17-25, 2022.

China Telecom, "Revised Wid: Sar schemes for UE power class 2 (PC2) for NR inter-band Carrier Aggregation and supplemental uplink (SUL) configurations with 2 bands UL," RP-212530, 3GPP TSG-RAN Meeting #93e, Electronic meeting, Sep. 13-17, 2021.

China Telecom et al., "New WID: Increasing UE power high limit for CA and DC," RP-212622, 3GPP TSG-RAN Meeting #93e, Electronic meeting, Sep. 13-17, 2021.

* cited by examiner

Table 1: PC configurations for PC2 UL inter band CA

|  | PC per band combination | PC for NR band x | PC for NR band y | Total power | If total power is capped? |
|---|---|---|---|---|---|
| Case a | 26dBm | 23dBm | 23dBm | 26dBm | NO |
| Case b | 26dBm | 23dBm | 26dBm | 27.8dBm | YES |
| Case c | 26dBm | 26dBm | 23dBm | 27.8dBm | YES |
| Case d | 26dBm | 26dBm | 26dBm | 29dBm | YES |

REPORTING OF ACHIEVABLE POWER PER COMPONENT CARRIER WITH MULTIPLE POWER SOURCES

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing reporting of achievable power per component carrier with multiple power sources and configuration based on such reporting.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus can include at least one processor and at least one memory including computer program code. The at least one memory and the computer program code can be configured to, with the at least one processor, cause the apparatus at least to perform receiving a request to report user equipment band combination capabilities. The at least one memory and the computer program code can also be configured to, with the at least one processor, cause the apparatus at least to perform reporting a capability of the apparatus to a network. The capability can include indication of one or more component carrier groups per band combination or per band. The one or more component carrier groups can contain indication of one or more power sources for the component carrier group.

An embodiment may be directed to an apparatus. The apparatus can include at least one processor and at least one memory including computer program code. The at least one memory and the computer program code can be configured to, with the at least one processor, cause the apparatus at least to perform sending a request to report user equipment band combination capabilities. The at least one memory and the computer program code can also be configured to, with the at least one processor, cause the apparatus at least to perform receiving a report of a capability of a user equipment. The capability can include indication of one or more component carrier groups per band combination or per band. The one or more component carrier groups can contain indication of one or more power sources for the component carrier group.

An embodiment may be directed to a method. The method can include receiving a request to report user equipment band combination capabilities. The method can also include reporting a capability of a user equipment to a network. The capability can include indication of one or more component carrier groups per band combination or per band. The one or more component carrier groups contain indication of one or more power sources for the component carrier group.

An embodiment may be directed to a method. The method can include sending a request to report user equipment band combination capabilities. The method can also include receiving a report of a capability of a user equipment. The capability can include indication of one or more component carrier groups per band combination or per band. The one or more component carrier groups can contain indication of one or more power sources for the component carrier group.

An embodiment may be directed to an apparatus. The apparatus can include means for receiving a request to report user equipment band combination capabilities. The apparatus can also include means for reporting a capability of the apparatus to a network. The capability can include indication of one or more component carrier groups per band combination or per band. The one or more component carrier groups can contain indication of one or more power sources for the component carrier group.

An embodiment may be directed to an apparatus. The apparatus can include means for sending a request to report user equipment band combination capabilities. The apparatus can also include means for receiving a report of a capability of a user equipment. The capability can include indication of one or more component carrier groups per band combination or per band. The one or more component carrier groups can contain indication of one or more power sources for the component carrier group.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing reporting of achievable power per component carrier with multiple power sources and configuration based on such reporting, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments can address challenges in coverage enhancement. As part of such coverage enhancements, power domain aggregation enhancement can include improving performance for multiple transmitters, e.g. 4Tx, with various power amplifier (PA) configurations. New radio (NR) has many power domain aggregation related standardized aspects. For a more specific example, in power class two (PC2), 26 dBm (400 mW), inter band uplink (UL) carrier aggregation (CA) with two bands, four possible power sources, or power class (PC) configurations, may be considered. As another example, there can be power class three (PC3), 23 dBm (200 mW), for band x and PC2 for band y. Although the total power as band combination (BC) is 27.8 dBm (200 mW+400 mW), the total power is capped by the PC2 in this example, since it is assumed that the total UE power is limited by the UE power class per BC. Thus, if band x uses 23 dBm (200 mW), the remaining power as BC is 23 dBm (200 mW) which is the maximum available power for band y at an instant (since 200+200=400 mW=26 dBm, which is equal to the maximum achievable power by PC2).

Yet another example is PC2 intra band contiguous/non-contiguous CA, where multiple component carriers (CCs) can be aggregated. Some of the CCs may be covered by a first PA and the rest of the CCs may be covered by a second PA and each achievable PC of each respective PA can be different (for example, 23 dBm, 26 dBm each), or all the CCs can be covered by two PAs with the same or different achievable PC. Whatever approach is used, the total power is capped by PC2 so that achievable power per CC is dependent on one another across the CCs.

As mentioned above, performance specifications may be based on the principle that the power source is common across CCs within a BC, for example UE maximum power may be limited by PC per-BC, where each CC can transmit up to MIN (PC per band, PC per BC) within a BC. It is noted that for intra band contiguous/non-contiguous UL CA case, PC per band can be the same as PC per BC. Third generation partnership project (3GPP), however, has gradually allowed more implementation flexibility than before. As a result, the original principle may not hold true in some cases. More specifically, in view of PC2 inter band UL CA, it may seem inappropriate to cap the total power if a UE has a capability to transmit, e.g., 23 dBm on band x and 26 dBm on band y. If such a cap is lifted, the total power can be e.g. 27.8 dBm per BC. In this case, band x can be used to transmit up to 23 dBm and band y can be used to transmit up to 26 dBm, respectively, regardless of the power being used by the other respective bands.

The principles can apply to intra band UL CA if multiple power sources are used for a CA, e.g., one 23 dBm capable PA covers two CCs (CC1+CC2) and the other 26 dBm capable PA covers the remaining two CCs (CC3+CC4) for intra band UL non-contiguous UL CA with four CCs. In this case, the power sources, for example 23 dBm PA and 26 dBm PA, can be independent each other and each power source per CC-group (for example CC1+CC2 and CC3+CC4) can transmit up to 23 dBm and 26 dBm each. Hence, the concept of PC per band and PC per BC may not be applicable. Even more complicated power aggregation requirements may arise and may be impossible address without certain embodiments.

Figure 1:
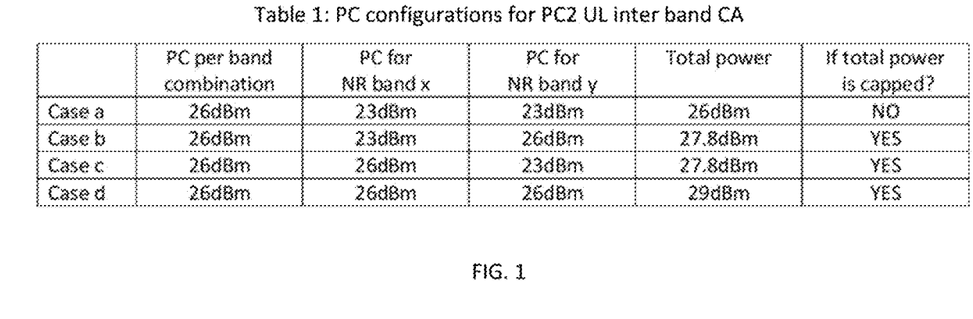
FIG. 1 illustrates a table of power class configurations for power class two uplink inter-band carrier aggregation.

FIG. 1 illustrates a table of PC configurations for PC2 UL inter band CA with 2 UL component carriers. Release 17 (Rel-17) specified requirements for PC2 (26 dBm) UL inter band CA can include the four cases (identified only for convenience and not priority or preference as cases a, b, c, and d, respectively) for PC configurations as captured. Carrier, in this context, can equate to band because intra band UL CA in each band may not occur within inter band UL CA.

Except for case a, the total power may be capped. More specifically, the sum of PC per band within UL CA for cases b, c, and d can be capped at 26 dBm according to the PC per band combination of the UE. Thus, with respect to case a, power to be delivered in each band within a CA can be independent, because each band can transmit up to 23 dBm at maximum while the total is still 26 dBm. On the other hand, with respect to cases b, c, and d, the total power is capped by 26 dBm, while PC of one of the bands or both bands can exceed 23 dBm. Hence, if at least power of one of the bands within a CA exceeds 23 dBm, the power of the other band may be reduced. In this context, a cap can be used such that different power sources, such as a power source in band x and a power source in band y, can be integrated and work as a common source if the total power, namely PC per BC, is lower than or equal to the sum of PC per band.

Another approach, which can be referred to as a sum method, can consider achievable total maximum power as the sum of PC per band within CA. More specifically, if the sum method is applied to case b or c, the total power can be considered as 27.8 dBm and no cap may be applied to the total power. Hence, if this feature is supported for a band combination, power sources, such as the power source in band x and the power source in band y, can become independent and thereby lift the restriction of the cap.

UL intra band CA with multiple PAs with different achievable powers are discussed in the following as examples. In release 17 (Rel-17) there can be PC2 Intra band contiguous and non-contiguous UL CA with up to 2 CCs in frequency range one (FR1) where a few PA configurations are considered, such as 23 dBm+23 dBm, 23 dBm+26 dBm and 26 dBm+26 dBm, while the total power is capped by 26 dBm except for 23 dBm+23 dBm.

Figure 2:
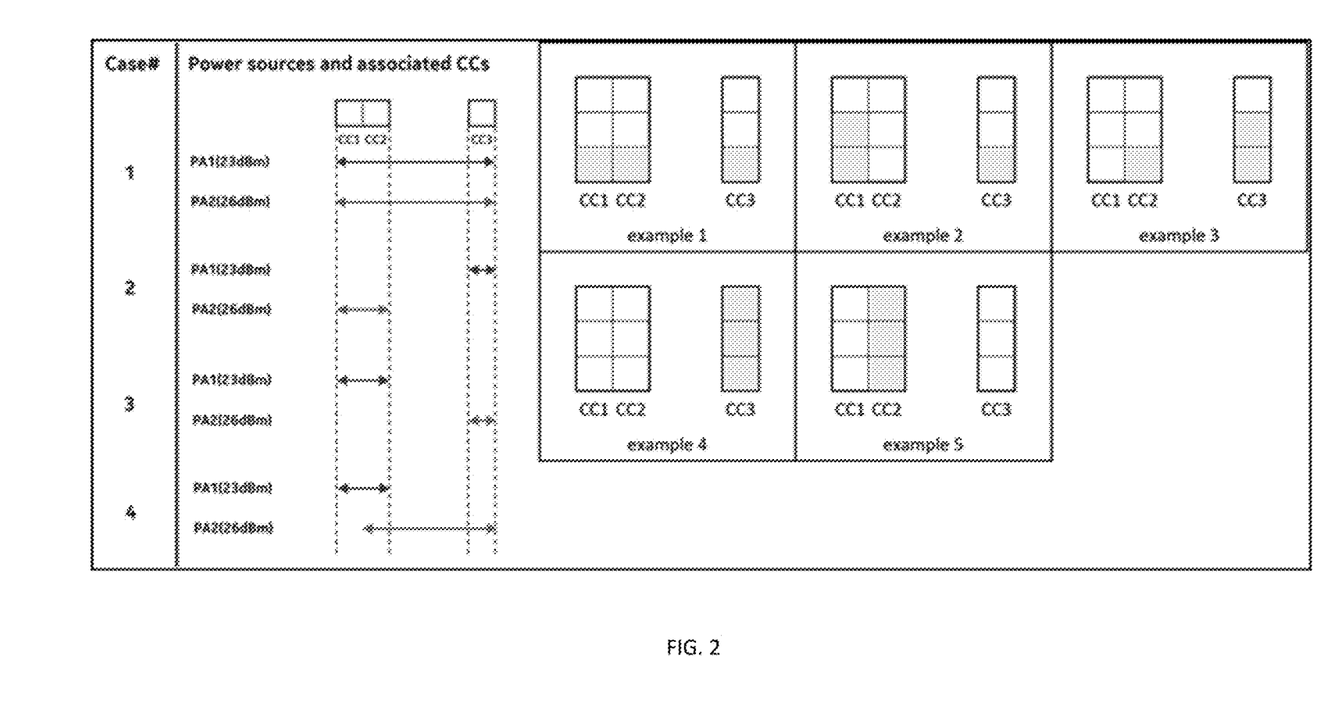
FIG. 2 illustrates possible power sources mapping to component carriers within carrier aggregation.

FIG. 2 illustrates possible power sources mapping to CCs within CA. The example considered is with 3 UL CCs in CA, with two possible power sources. More particularly, possible power sources mapping to corresponding CCs are summarized in FIG. 2 by taking 23 dBm+26 dBm power sources as an example. The cases are labelled as cases 1-4, for ease of reference, and not by way of preference or priority. The numbering of the examples is similarly for convenience only.

Although the current specifications allow a user equipment (UE) to report the number of supported PAs for BC, until now, case 1, in which power sources are shared across all the CCs belonging to band or BC, has been used. Since power from the two power sources can be shared with all the three CCs, case 1 can deal with all the examples in FIG. 2. Case 2, however, cannot cover examples 3, 4, and 5 and case 3 cannot cover example 1, 2, 4, and 5. Cases 2 and 3 for PA configurations may be used if a band has very wide spectrum, since one PA may be unable to cover the entire band. Case 4 cannot handle examples 1, 2, and 4.

The network may need to know which power source can belong to which CC group and each respective power source's achievable power to conduct resource scheduling since achievable power per CC-group can be different with different power source mappings. Without certain embodiments there may be no way to allow a UE to report the aforementioned UE's ability to network and network cannot maximize UE's ability due to lack of the information.

If the above-described restriction on the total achievable power is lifted somehow, which power source can cover which CCs may need to be clarified to enable network to understand the UE's true ability. For instance, with case 4, only CC2 can achieve 27.8 dBm while CC1 can achieve 23 dBm and CC3 can achieve 26 dBm. Hence, if a UE is in a power hungry situation, the network may need to schedule resources to CC2. For another example, with case 2, since CC1+CC2 can use up to 26 dBm and CC3 can use up to 23 dBm independently, if a UE is at cell edge, the network can schedule important information via CC1 or CC2 as primary cell (PCell) and CC3 may be also used with smaller number of RBs to compensate for less power than CC1 or CC2 if needed. The number of power sources alone, like the number of PAs, cannot provide the network with any clues to how to make maximum use of power sources and network may need to know how the power sources can be mapped across the CCs. Once the network knows the mapping, the network may reflect this knowledge of the mapping either explicitly or implicitly. As an example of explicit usage of knowledge of the mapping, when configuring the UE with UL CA configuration, the network can provide an indication of which power source to use for which carrier or can set the maximum power allowed according to the determined maximum power for each power source. As an example of using this knowledge implicitly, the network can provide an UL CA configuration such that UE can best take benefit of the UE's own PA configurations, such as grouping the UL CA carriers within the cell group so that UE can freely use the UL power to the UE's maximum possibilities. Both the explicit and implicit usage of the knowledge of the mapping can be characterized as the network configuring the user equipment based on the mapping. Thus, configuring the UE based on the knowledge of the mapping can include providing a suitable p-Max configuration that sets the maximum power per carrier. As another option, the configuring the UE based on the knowledge of the mapping may be an indication that UE is allowed to use higher power according to the combined p-Max values. As a further example, configuring the UE based on the knowledge of the mapping may be an implicit grouping of carriers within a cell group.

The performance requirements of 4 Tx may be specified for a band where several PA configurations are captured in Rel-18. The configurations may be 23 dBm×4, 26 dBm×4, 26 dBm×2+23 dBm×2 and they can be used with any of PC3, PC2 and PC1.5 for single band operation, namely without CA. It is, however, possible to consider some other configurations such as (23, 26, 26, 26), (23, 23, 26, 29), or the like. PCs with these PA configurations may be used to support intra band CA with 4 Tx with these many possible configurations later, where simultaneous multiple feature usage like PC2 intra band UL CA with two CCs and PC2 UL MIMO with one CC may also be discussed.

Certain embodiments may involve the UE indicating the PC per CC group for the UE to the network. This can be distinguished from indicating PC per band within CA. Likewise, PC per CC group can be distinguished from the sum method discussed above.

Certain embodiments relate to the indication and use of power source (PS) per-CC group (CCG). Each CC group can have its own power source(s) that only applies to the CCs in the CC group. Examples of power sources can be PC, equivalent isotropically radiated power (EIRP), total radiated power (TRP), or the like. The PS-CCG can indicate that those CCs belong to the same power source(s), for example PC, in a band and/or BC. The minimum unit of PS, for example PC per-band, can become PS-CCG.

One aspect of PS per CCG can include PSs and its mapping to CCs. CCs can belong to multiple PS-CCGs wherein the CC(s) can use multiple PSs simultaneously, for example for a feature such as transmission diversity (TxD), UL multiple input/multiple output (MIMO), or the like. In one example, CC1 can belong to PS1 and PS2, where PS1 and PS2 may be the same PC or different PC. CC1 can use either of PS1 or PS2, or both PS1 and PS2 simultaneously. In another example, CC1+CC2 can belong to PS1 and CC2+CC3 can belong to PS2, where PS1 and PS2 may be the same PC or different PC. CC2 can use either of PS1 or PS2, or both PS1 and PS2 simultaneously. Then such mappings can be provided differently for different features, for example TxD or UL MIMO can have one PS mapping on CC2 with the power of PS1+PS2, while CC1 or CC3 may use different features with maximum achievable power of PS1 or PS2, respectively.

Another aspect of PS per CCG can include PS handling across PS-CCGs. For example, PS-CCG can be treated as an independent PS from the other PS-CCG unless the sum of the multiple PS-CCGs in a band and/or BC is capped by a value lower than the sum of the multiple PS-CCGs. CCs belonging to the same PS-CCG can use the same PS of the PS-CCG to derive $P_{CMAX,c}$ or $P_{CMAX,f,c}$. If a CC belongs to multiple PS-CCG, all the available PSs can be taken into account in $P_{CMAX,c}$ or $P_{CMAX,f,c}$.

A further aspect of PS per CCG can include concurrent feature usage. The PS-CCG can be different in case certain features are concurrently used with a certain condition. For example, PC2 intra band non-contiguous UL CA with UL MIMO and PC2 intra band contiguous UL CA with UL MIMO may have different PCs per CC group.

A power source can be defined as a source to deliver a certain achievable power to CCs belonging to the power source. The power source can include a PA and associated achievable power, but may not be limited to the PA. For instance, a Tx chain with or without antenna, a panel, or a certain group of antenna arrays, or the like, can be a power source. Thus, a power source does not have to be from a single power class.

Figure 3:
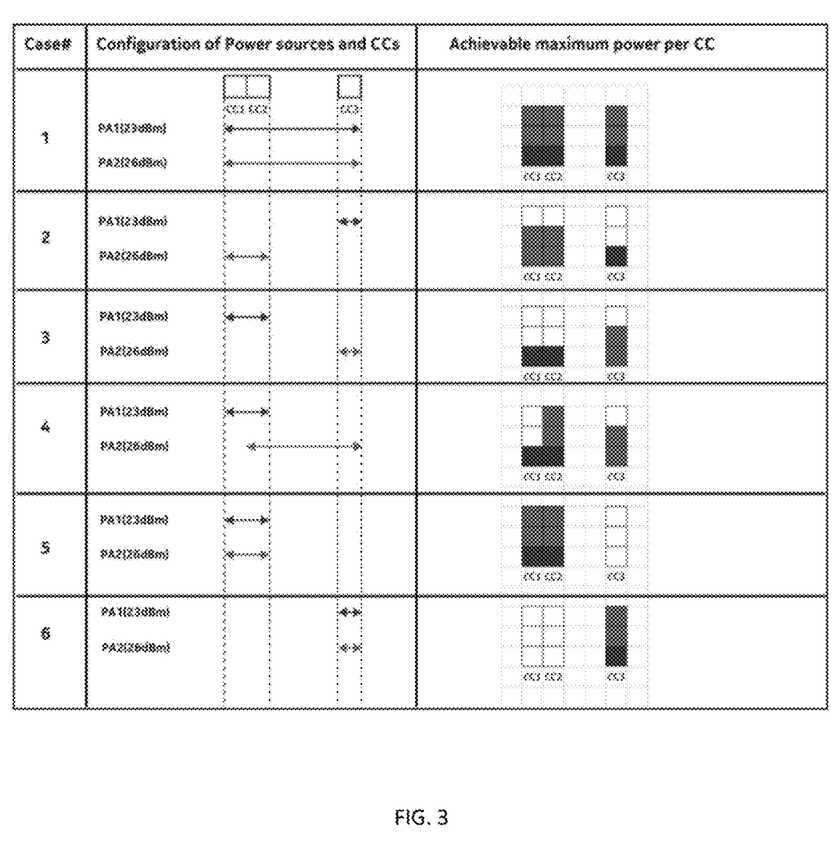
FIG. 3 illustrates achievable maximum power per component carrier using a power source—component carrier group approach, according to certain embodiments.

FIG. 3 illustrates achievable maximum power per component carrier using a power source—component carrier group approach, according to certain embodiments. The examples of FIG. 3 may relate to uplink intra band carrier aggregation. In addition to the four cases in FIG. 2, FIG. 3 considers two additional cases assuming TxD and/or UL MIMO.

With certain embodiments using PS-CCG, which CC can transmit how much power can be correctly understood by network. Achievable power per CC with how many PSs and each respective power can be valuable for network configuration. Without certain embodiments, therefore, the network cannot select features and parameters in a suitable way. Note that the examples illustrated in FIGS. 2 and 3 are just some of the examples.

There may likewise be a variety of impacts on network configurations. For example, one configuration that may be affected is UL duty cycle. If a resource is allocated to CC3 alone in case 2, then the network may not have to take care of UL duty cycle for the UE to meet specific absorption rate (SAR) while if CC1 and/or CC2 are used, the network may need to take into account UL duty cycle.

Another example of network impact is on UL MIMO. With case 4, the network can know that the UE may able to do UL MIMO or TxD over CC2 only.

Figure 4:
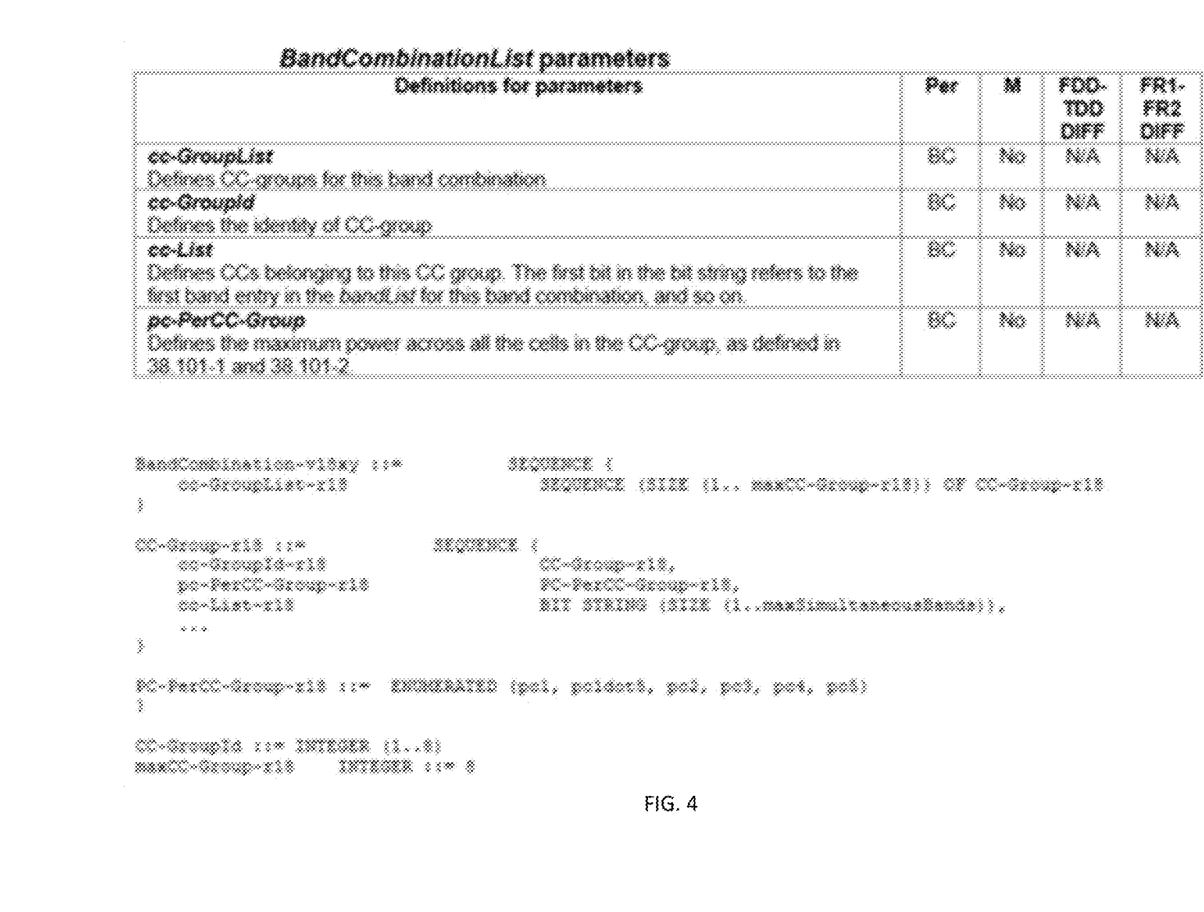
FIG. 4 illustrates band combination list parameters according to certain embodiments.

FIG. 4 illustrates band combination list parameters according to certain embodiments. As shown in FIG. 4, UE capabilities for band combination list parameters of the information element, BandCombinationList, can include cc-GroupList, cc-GroupId, cc-List, and pc-PerCC-Group. The value of cc-GroupList can defined CC-groups for a given band combination. The value of cc-GroupId can define the identity of the CC-group. The value of cc-List can define CCs belonging to this CC group. The first bit in the string can refer to the first band entry in the bandList for this band combination, and so on. The value of pc-PerCC-Group can define the maximum power across all the cells in the CC-group, as defined, for example, in 3GPP technical specification (TS) 38.101-1 and 38.101-2. In this example, the CC-group is not differentiated across different features and each band combination only has one list of CC-groups, and each CC-group only has a single power source (PS), indicated via a power class (PC) signalling. In other embodiments, multiple such CC-group lists can be provided so that each CC-group list corresponds to a particular feature, such as TxD, MIMO and so on.

As shown in FIG. 4, the cc-GroupList can be a sequence, the cc-GroupID can be a value, the cc-List can be a bit string, and the pc-PerCC-Group can be an integer. Similarly, the maxCC-Group value can be an integer.

Figure 5:
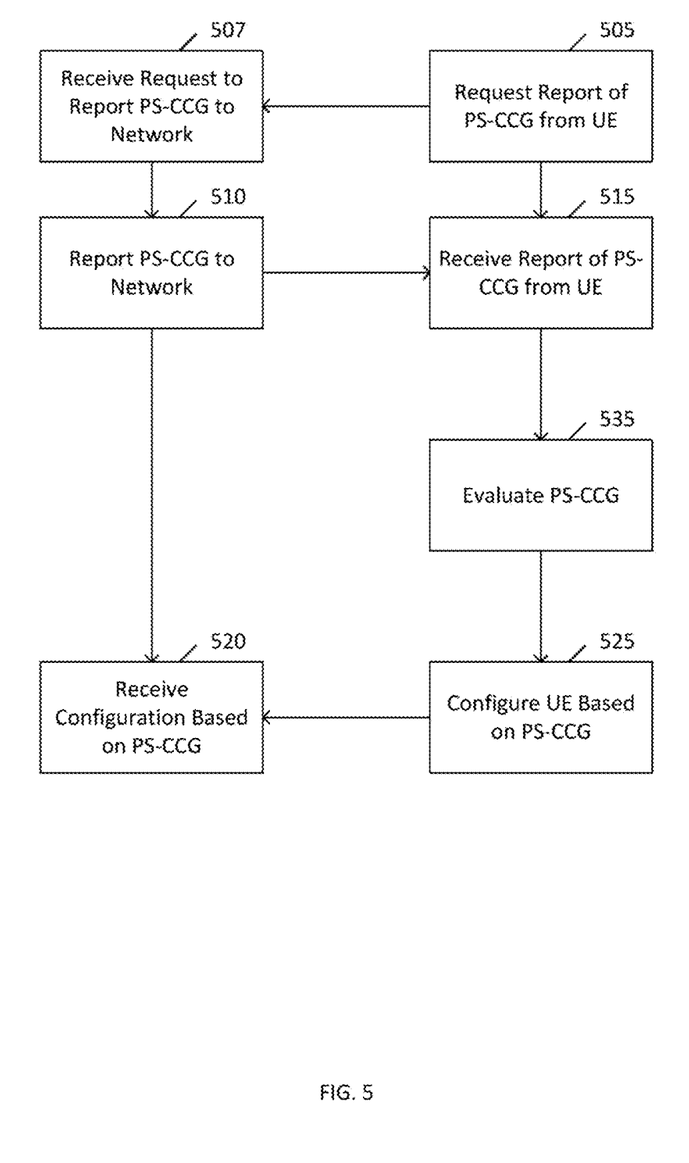
FIG. 5 illustrates a method according to certain embodiments.

FIG. 5 illustrates a method according to certain embodiments. As shown a method can include, at 510, reporting to a network a capability of a user equipment, which may be the apparatus implementing the method. The capability can be power source per component carrier group. FIG. 4 illustrates a mechanism by which the PS-CCG can be reported to the network, for example, to a gNB. As shown in FIG. 5, at 505, the report of the capability may be requested by the network, and the UE can receive the request at 507. Thus, the reporting at 510 can be triggered by the request sent at 505 and received at 507.

In the method of FIG. 5, the capability can indicate an association between a given power source of the apparatus and a corresponding component carrier group. The capability can further indicate an achievable power of the given power source. For example, the capability can indicate which power source belongs to which CC group and each respective power source's achievable power to conduct resource scheduling.

The capability can indicate that each component carrier in the component carrier group belongs to the power source in a band or band combination. For example, the PS-CCG can indicate that the CCs belong to the same power source(s), for example PC, in a band and/or BC.

A plurality of power sources can be reported, each power source of the plurality of power sources being uniquely associated with component carriers of a given component carrier group. For example, each CC group can have its own power source(s) (for example, PC, EIRP, TRP, or the like) that only applies to the CCs in the CC group.

The capability can indicate that at least one component carrier belongs to a plurality of component carrier groups, each component carrier group of the plurality of component carrier groups being associated with a different power source. For example, CCs can belong to multiple PS-CCGs wherein the CC(s) can use multiple PSs simultaneously, for example for a feature like TxD, UL MIMO, or the like.

The method of FIG. 5 can also include, at 520, receiving a configuration from the network based on the power source per component carrier group. For example, UL MIMO and/or UL duty cycle of the UE may be configured by the network based on the reported capability, as explained above.

The method can also include, at 515, receiving a report of a capability of a user equipment at the apparatus implementing this procedure, which may be a radio access network node, such as a gNB. The capability can include a power source per component carrier group. This may be the same PS-CCG reported at 510. The method can further include, at 525, the network configuring the user equipment based on the power source per component carrier group. This can be the same configuration received by the UE at 520. The configuring can include configuring at least one of uplink multiple-input multiple-output or uplink duty cycle of the user equipment. These are just examples. Other examples include providing a maximum power configuration to the user equipment based on the power source per component carrier group.

At 535, the method can include, evaluating the PS-CCG. The configuring at 525 can be based on the evaluation at 535. The evaluating can include treating each power source per component carrier group as independent when a plurality of reports of power source per component carrier group are provided. For example, PS-CCG can be treated as an independent PS from the other PS-CCGs unless the sum of the multiple PS-CCGs in a band and/or a BC is capped by a value lower than the sum of the multiple PS-CCGs.

The evaluating comprises deriving a power class maximum value based on the report. For example, for CCs belonging to the same PS-CCG the same PS of the PS-CCG can be used to derive $P_{CMAX,c}$ or $P_{CMAX,f,c}$. As another example, if a CC belongs to multiple PS-CCG, all the available PS s can be taken into account in $P_{CMAX,c}$ or $P_{CMAX,f,c}$.

Figure 6:
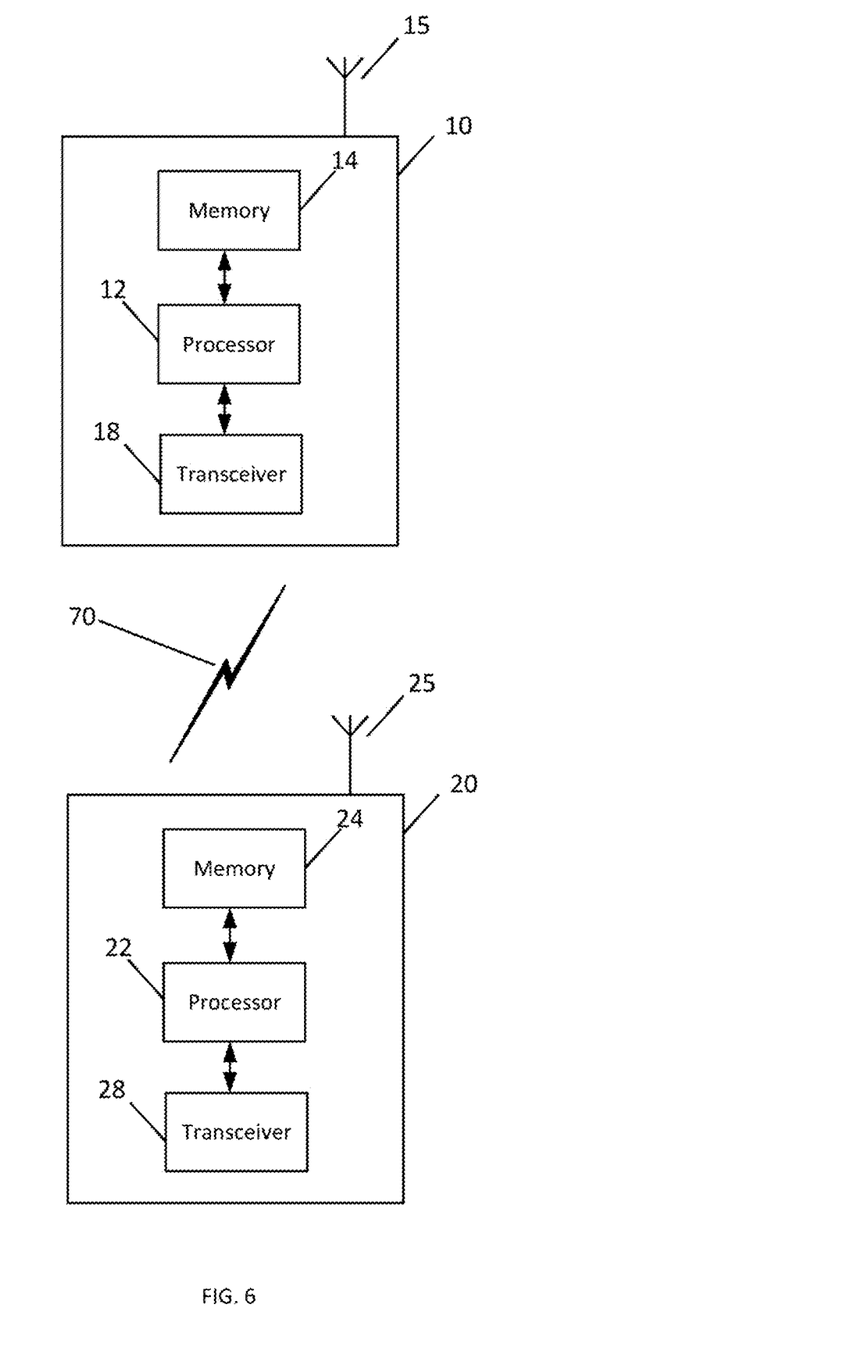
FIG. 6 illustrates an example block diagram of a system, according to an embodiment.

FIG. 6 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), transmission/reception point, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/ means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, transmission/reception point, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-3, or any other method described herein. In some embodiments, as discussed herein, apparatus 10 may be configured to perform a procedure relating to providing reporting of achievable power per component carrier with multiple power sources and configuration based on such reporting, for example.

FIG. 6 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-3, or any other method described herein. For example, in an embodiment, apparatus 20 may be controlled to perform a process relating to providing reporting of achievable power per component carrier with multiple power sources and configuration based on such reporting, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, in certain embodiments there it may be possible for the network to take in account the details of the association between various power sources and component carriers in the user equipment. This may allow the network to more effectively control configuration of the UE transmission characteristics, such as UL duty cycle.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

BC Band Combination
CA Carrier Aggregation
CC Component Carrier
EIRP Equivalent Isotropic Radiated Power
FDD Frequency Division Duplex
FR Frequency Range
LTE Long Term Evolution
MIMO Multiple Input, Multiple Output
MR-DC Multi-RAT Dual Connectivity
NR New Radio
PA Power Amplifier
PC Power Class
PS Power Source
RF Radio Frequency
SAR Specific Absorption Rate
TDD Time Division Duplex
TRP Total Radiated Power
TxD Transmit Diversity
UE User Equipment
UL Uplink
WI Work Item

We claim:

1. An apparatus, comprising:
at least one processor; and
at least one memory including computer program code,
wherein the at least one memory and the computer program code are configured to, with the at least one processor, cause the apparatus at least to perform
receiving a request to report user equipment band combination capabilities;
reporting a capability of the apparatus to a network, wherein the capability comprises an indication of one or more component carrier groups per band combination or per band, wherein the one or more component carrier groups contain an indication of one or more power sources for the component carrier group; and
receiving, from the network based on the power source per component carrier group, an uplink duty cycle and an uplink multiple-input multiple-output configuration.

2. The apparatus of claim 1, wherein the at least one memory and the computer program code are configured to, with the at least one processor, cause the apparatus at least to perform:
receiving, from the network based on the power source per component carrier group, a maximum power configuration.

3. The apparatus of claim 1, wherein the capability of the apparatus indicates an association between a given power source of the apparatus and a corresponding component carrier group.

4. The apparatus of claim 3, wherein the capability further indicates an achievable power of the given power source.

5. The apparatus of claim 1, wherein the capability indicates that each component carrier in the component carrier group belongs to the power source in a band or band combination.

6. The apparatus of claim 1, wherein a plurality of power sources are reported, each power source of the plurality of power sources being uniquely associated with component carriers of a given component carrier group.

7. The apparatus of claim 1, wherein the capability indicates that at least one component carrier belongs to a plurality of component carrier groups, each component carrier group of the plurality of component carrier groups being associated with a different power source.

8. An apparatus, comprising:
at least one processor; and
at least one memory including computer program code,
wherein the at least one memory and the computer program code are configured to, with the at least one processor, cause the apparatus at least to perform
sending a request to report user equipment band combination capabilities;
receiving a report of a capability of a user equipment, wherein the capability comprises an indication of one or more component carrier groups per band combination or per band, wherein the one or more component carrier groups contain an indication of one or more power sources for the component carrier group; and
transmitting an uplink duty cycle and an uplink multiple-input multiple-output configuration.

9. The apparatus of claim 8, wherein the capability indicates an association between a given power source of the user equipment and a corresponding component carrier group.

10. The apparatus of claim 9, wherein the capability further indicates an achievable power of the given power source.

11. The apparatus of claim 8, wherein the capability indicates that each component carrier in the component carrier group belongs to the power source in a band or band combination.

12. The apparatus of claim 8, wherein a plurality of power sources are reported, each power source of the plurality of power sources being uniquely associated with component carriers of a given component carrier group.

13. The apparatus of claim 8, wherein the capability indicates that at least one component carrier belongs to a plurality of component carrier groups, each component carrier group of the plurality of component carrier groups being associated with a different power source.

14. The apparatus of claim 8, wherein the at least one memory and the computer program code are configured to, with the at least one processor, cause the apparatus at least to perform evaluating the capability and at least one of:
configuring an uplink multiple-input multiple-output based on the power source per component carrier group;
configuring an uplink duty cycle of the user equipment based on the power source per component carrier group; or
providing a maximum power configuration from the apparatus to the user equipment based on the power source per component carrier group.

15. The apparatus of claim 14, wherein the evaluating comprises treating each power source per component carrier group as independent when a plurality of reports of power source per component carrier group are provided.

16. The apparatus of claim 14, wherein the evaluating comprises deriving a power class maximum value based on the report.

17. A method, comprising:
- receiving a request to report user equipment band combination capabilities;
- reporting a capability of a user equipment to a network, wherein the capability comprises an indication of one or more component carrier groups per band combination or per band, wherein the one or more component carrier groups contain an indication of one or more power sources for the component carrier group; and
- receiving, from the network based on the power source per component carrier group, an uplink duty cycle and an uplink multiple-input multiple-output configuration.

18. The method of claim 17, further comprising:
- receiving, from the network based on the power source per component carrier group, a maximum power configuration.

19. The method of claim 17, wherein the capability of the user equipment indicates an association between a given power source of the user equipment and a corresponding component carrier group.

20. The method of claim 19, wherein the capability further indicates an achievable power of the given power source.

* * * * *